United States Patent
Mori et al.

(10) Patent No.: US 7,934,863 B2
(45) Date of Patent: May 3, 2011

(54) LIQUID CRYSTAL DISPLAY DEVICE

(75) Inventors: Ikuko Mori, Mobara (JP); Ryutaro Oke, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 197 days.

(21) Appl. No.: 12/398,334

(22) Filed: Mar. 5, 2009

(65) Prior Publication Data

US 2009/0225567 A1  Sep. 10, 2009

(30) Foreign Application Priority Data

Mar. 6, 2008 (JP) ................................ 2008-055722

(51) Int. Cl.
*F21V 33/00* (2006.01)

(52) U.S. Cl. .......................... 362/612; 362/800; 362/97.3

(58) Field of Classification Search .................. 362/612, 362/613, 611, 97.1, 97.2, 97.3, 800
See application file for complete search history.

(56) References Cited

U.S. PATENT DOCUMENTS

| | | | | |
|---|---|---|---|---|
| 7,461,962 B2 * | 12/2008 | Lee et al. | ....................... | 362/613 |
| 7,568,826 B2 * | 8/2009 | Hamada et al. | ................ | 362/612 |
| 2008/0175023 A1 * | 7/2008 | Lee et al. | ....................... | 362/613 |
| 2008/0304285 A1 * | 12/2008 | Iwasaki | ........................ | 362/612 |

FOREIGN PATENT DOCUMENTS

JP  2005-228535  8/2005

* cited by examiner

*Primary Examiner* — Laura Tso

(74) *Attorney, Agent, or Firm* — Antonelli, Terry, Stout & Kraus, LLP.

(57) ABSTRACT

An object of the present invention is to provide a liquid crystal display device where there is less inconsistency in the brightness of the backlight due to deterioration in the efficiency of light emission of the light emitting diodes. The present invention provides a liquid crystal display device which stands on a horizontal surface for use having: a liquid crystal display panel; and a backlight provided on the rear of this liquid crystal display panel, and the light emitting source of the above described backlight is formed of a number of light emitting diodes, at least some of which are aligned in the up-down direction of the backlight, and the interval between light emitting diodes aligned at the top of the above described backlight is smaller than the interval between light emitting diodes aligned at the bottom of the above described backlight.

9 Claims, 7 Drawing Sheets ately the efficiency of light emission is poorer and the life shorter in light emitting diodes provided on the upper side than in light emitting diodes provided on the lower side.
LIQUID CRYSTAL DISPLAY DEVICE The present application claims priority over Japanese Application JP 2008-055722 filed on Mar. 6, 2008, the contents of which are hereby incorporated into this application by reference.

BACKGROUND OF THE INVENTION (1) Field of the Invention

The present invention relates to a liquid crystal display device and, in particular, to a liquid crystal display device which stands on a horizontal surface for use.

(2) Related Art Statement

Liquid crystal display devices incorporated in television sets and monitors, for example, stand on a horizontal surface for use.

In addition, liquid crystal displays are generally formed to have a liquid crystal display panel and a backlight provided on the rear of the liquid crystal display panel. Liquid crystal display panels are not self-luminous, and thus require a backlight, as described above. Liquid crystal display panels are operated so that the transmittance of light from the backlight changes for each pixel, and thus, an image is displayed.

In this case, the backlight is formed as a surface light source, and one known type of light emitting source is light emitting diodes (LED's).

Backlights using light emitting diodes are formed of a light guide plate provided so as to face at least the display region of the liquid crystal display panel and a number of light emitting diodes aligned along at least one side of this light guide plate, for example.

In addition to thus formed backlights, there are backlights where a reflective plate where a special uneven surface is formed is provided instead of the above described light guide plate, as disclosed in Patent Document 1, for example, and a number of light emitting diode are aligned along the respective sides: the upper and lower side, of the reflective plate.

[Patent Document 1] Japanese Unexamined Patent Publication 2005-228535

SUMMARY OF THE INVENTION

Problem to Be Solved by the Invention

However, it has been pointed out that in the backlight of thus formed liquid crystal display devices, the efficiency of light emission is poorer and the life shorter in light emitting diodes provided on the upper side than in light emitting diodes provided on the lower side.

The present inventors found the cause, and as a result made it clear that the temperature on the upper side is high and the temperature on the lower side is low, due to heat convection and the like in liquid crystal display devices which stand on a horizontal surface for use, and thus, the efficiency of light emission becomes poor in light emitting diodes on the upper side, which are in an environment where the temperature is high, and the life becomes shorter.

When such liquid crystal display device keep being used as they are, the brightness of the backlight becomes inconsistent in the display region of the liquid crystal display panel, and therefore, measures for solving this have been desired.

An object of the present invention is to provide a liquid crystal display device where there is less inconsistency in the brightness of the backlight due to deterioration in the efficiency of light emission of the light emitting diodes.

Means for Solving Problem

Typical inventions disclosed in the present application are summarized below.

(1) The liquid crystal display device according to the present invention is a liquid crystal display device which stands on a horizontal surface for use having:

a liquid crystal display panel; and a backlight provided on the rear of this liquid crystal display panel, and characterized in that the light emitting source of the above described backlight is formed of a number of light emitting diodes, at least some of which are aligned in the up-down direction of the backlight, and the interval between light emitting diodes aligned at the top of the above described backlight is smaller than the interval between light emitting diodes aligned at the bottom of the above described backlight, for example.

(2) The liquid crystal display device according to the present invention has the structure in (1), for example, and is characterized in that the above described light emitting diodes are aligned so that the interval between the above described light emitting diodes becomes smaller from the top down in steps.

(3) The liquid crystal display device according to the present invention has the structure in (1), for example, and is characterized in that the above described backlight is formed of a light guide plate placed so as to face at least the display region of the above described liquid crystal display panel, and a number of light emitting diodes aligned along at least one side wall from among the left and right side walls of the light guide plate, so that light from the above described light emitting diodes is guided toward the above described liquid crystal display panel through the above described light guide plate.

(4) The liquid crystal display device according to the present invention is characterized in that the above described backlight has a reflective plate placed so as to face at least the display region of the above described liquid crystal display panel and a number of light emitting diodes placed along at least one side from among the left and right sides of the reflective plate, so that light from the above described light emitting diodes is guided toward the above described liquid crystal display panel via the above described reflective plate, for example.

(5) The liquid crystal display device according to the present invention has the structure in (1), for example, and is characterized in that a pulse voltage is applied to the light emitting diodes, and the duty ratio of the pulse voltage applied to light emitting diodes provided at the top of the above described backlight is smaller than the duty ratio of the pulse voltage applied to light emitting diodes provided at the bottom of the above described backlight.

(6) The liquid crystal display device according to the present invention has the structure in (1), for example, and is characterized in that a number of light emitting diodes are aligned along the bottom side of the above described backlight.

(7) The liquid crystal display device according to the present invention has the structure in (6), for example, and is characterized in that a number of light emitting diodes are aligned along the top side of the above described backlight.

(8) The liquid crystal display device according to the present invention has the structure in (7), for example, and is characterized in that the interval between light emitting diodes is the same at the top and bottom of the above described backlight.

(9) The liquid crystal display device according to the present invention is characterized in that the interval between light emitting diodes provided along the top side of the above described backlight is smaller than the interval between light emitting diodes provided along the bottom side of the above described backlight, for example.

Here, the present invention is not limited to the above described structures, and various modifications are possible within such a scope that the technical idea of the present invention is not deviated from. In addition, examples of the structure according to the present invention other than the above described structures will be clarified in the descriptions throughout the entirety of the present specification and the drawings.

EFFECTS OF THE INVENTION

In liquid crystal display devices having these structures, there is less inconsistency in the brightness of the backlight due to deterioration in the efficiency of light emission of the light emitting diodes.

Other effects of the present invention will become clearer from the description throughout the entirety of the specification.

EXPLANATION OF SYMBOLS

Figure 1:
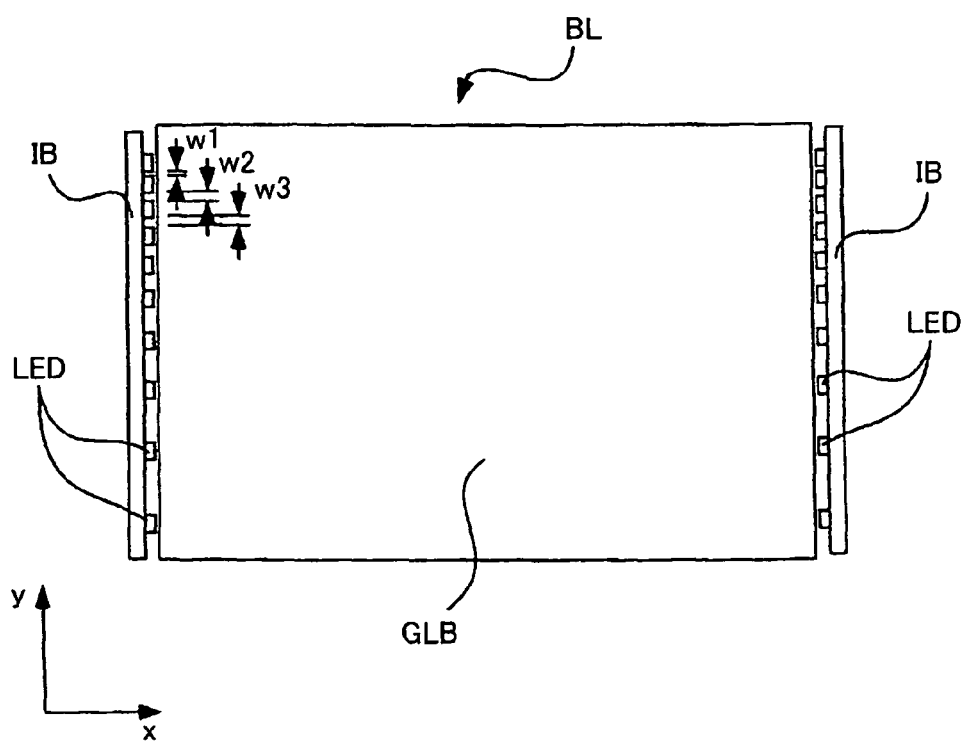
FIG. 1 is a plan diagram showing an example of the backlight provided in the liquid crystal display device according to the present invention.

PNL . . . liquid crystal display panel
AR . . . display region
OS . . . optical sheet
BL . . . backlight
GLB . . . light guide plate
LED . . . light emitting diode
IB . . . insulating substrate
RF . . . reflective plate
FM . . . housing
PSM . . . prism

DETAILED DESCRIPTION OF THE INVENTION

The embodiments of the present invention are described below in reference to the drawings. Here, the same symbols are attached to components which are the same or similar in the drawings and the embodiments, and the descriptions thereof are not repeated.

First Embodiment

Figure 2:
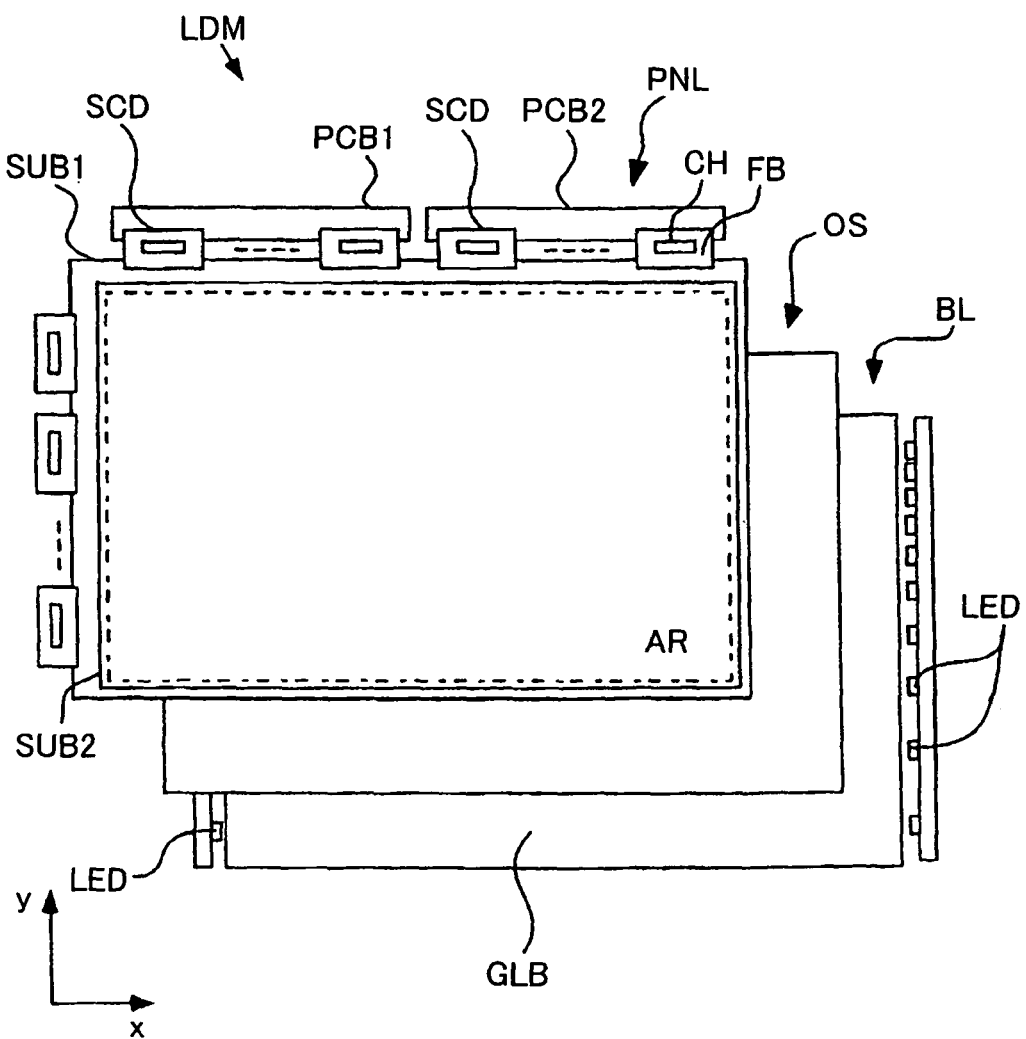
FIG. 2 is a schematic diagram showing the configuration of the liquid crystal display device according to one embodiment of the present invention.

FIG. 2 shows a liquid crystal display panel PNL formed as a module (liquid crystal display module LDM), an optical sheet OS and a backlight BL in the liquid crystal display device according to the present invention, and these are provided so as to be layered on top of each other in sequence starting from the viewer side.

Here, the liquid crystal display panel PNL, the optical sheet OS and the backlight BL are modules using a number of frames, not shown.

Figure 3:
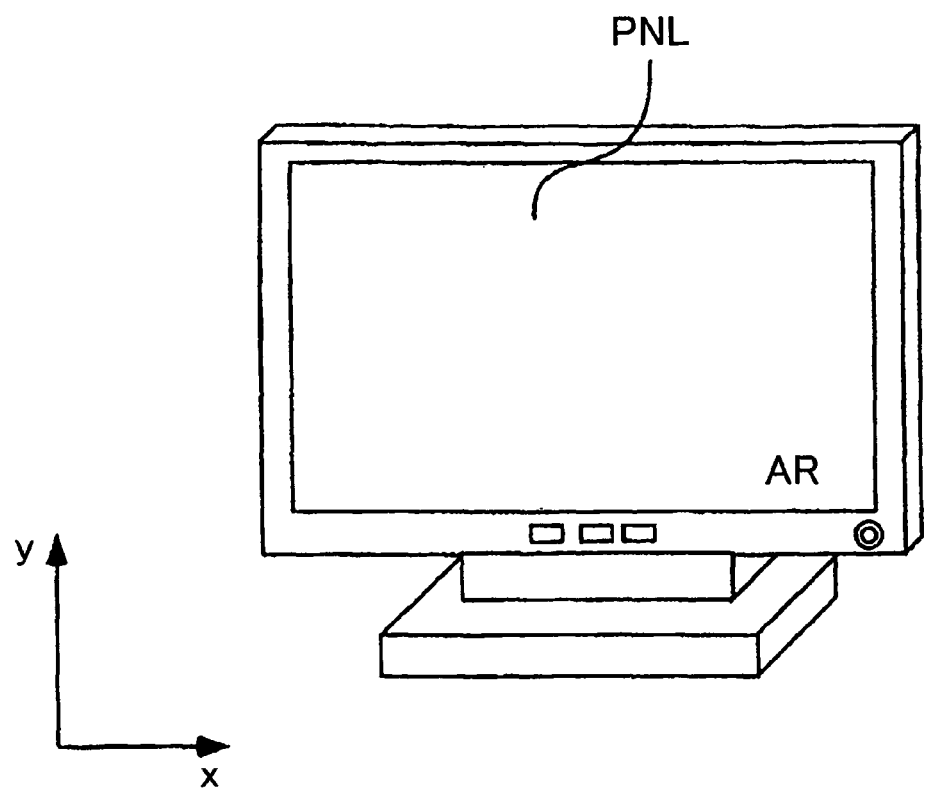
FIG. 3 is a perspective diagram showing how the liquid crystal display device according to the present invention is used.

In addition, the thus formed liquid crystal display module LDM is used when incorporated in a TV set or a monitor, as shown in FIG. 3, for example. Accordingly, the liquid crystal display module LDM stands on a horizontal surface for use, and the direction y in FIG. 3 corresponds to the up-down direction of the liquid crystal display module LDM.

Returning to FIG. 2, the liquid crystal display panel PNL has a pair of substrates SUB1 and SUB2 made of glass, for example, which are placed in parallel as an outer housing, and is formed of liquid crystal sandwiched between these substrates SUB1 and SUB2.

Pixels (not shown) arranged in a matrix are formed on the surface of the substrates SUB1 and SUB2 on the liquid crystal side with the liquid crystal as one component, and the transmittance of light can be controlled for each pixel.

The region where pixels are formed is a display region AR (region surrounded by single-dot chain line frame in figure), and the entirety of the display region AR is irradiated with light from the below described backlight BL, so that the viewer can see images through light that transmits through the respective pixels.

The substrate SUB1 located in the rear as seen by the viewer has portions which are exposed from the substrate SUB2 on the left side and the upper side in the figure, and one side of a number of semiconductor devices SCD is connected to these portions.

These semiconductor devices SCD are formed of circuits for independently driving the pixels. The semiconductor devices SCD aligned in the direction x in the figure (video signal drive circuits) from among the semiconductor devices SCD are connected to printed circuit boards PCB1 and PCB2 on the side facing the side to which the above described substrate SUB is connected, so that an external input signal can be inputted from a circuit, not shown, via the printed circuit boards PCB1 and PCB2. The liquid crystal display device according to the present embodiment is formed of two printed circuit boards PCB1 and PCB2 which are aligned in parallel, for example, as described above.

In addition, semiconductor devices SCD (scan signal drive circuits) aligned in the direction y in the figure from among the above described semiconductor devices SCD allow an external input signal be inputted via wires (not shown) formed on the surface of the substrate SUB1, and therefore, have a structure where no substrates corresponding to the above described printed circuit boards PCB1 and PCB2 are connected.

A backlight BL is provided in the rear of the liquid crystal display panel PNL with a diffusion sheet, a prism sheet or an optical sheet OS made of a multilayer body of these, for example, in between. The optical sheet OS diffuses or condenses light from the backlight BL, so that light is guided toward the liquid crystal display panel PNL.

The above described backlight BL is formed of a light guide plate GLB and a number of light emitting diodes LED which are placed so as to face the side wall surfaces of the sides in the direction y in the figure, for example.

The above described light guide plate GLB is formed of a light transmitting material, for example a resin, and has a size that allows the light guide plate to face at least the above described display region AR of the above described liquid crystal display panel PNL.

The light guide plate GLB is formed so that light from the above described number of light emitting diodes LED enters through the above described side wall surfaces and is emitted through the entirety of the surface facing the above described liquid crystal display panel PNL.

FIG. 1 is a plan diagram showing only the above described backlight BL. A number of light emitting diodes LED are aligned on the side wall surface along the side of the light guide plate GLB in the direction y in the figure. A number of light emitting diodes LED aligned along one side of the light guide plate GLB are mounted on the insulating substrate IB. In addition, a number of light emitting diodes are aligned along the other side in the same structure.

The light emitting diodes LED on the insulating substrate IB are aligned so that the interval between adjacent diodes becomes larger from the top down in sequence in the figure. That is to say, when the interval between the light emitting diode LED at the top in the figure and the light emitting diode LED located beneath it is w1, and the interval with the light emitting diode LED located further beneath is w2, and the interval with the light emitting diode LED located further beneath is w3 and so on, the relationship is w1<w2<w3< . . . . In other words, in the backlight BL which stands on a horizontal surface for use, the light emitting diodes LED are arranged with low density to high density from the bottom up.

In the case of this embodiment, light emitting diodes LED are aligned along the two sides of the light guide plate GLB in the direction y in the figure, and the light emitting diodes LED aligned along the sides have the above described positional relationship.

When backlights BL stand for use, the temperature is high at the top and low at the bottom due to heat convection. Therefore, light emitting diodes LED located at the top tend to have poor efficiency in light emission, due to the high temperature in the environment. However, even when the efficiency in light emission of the individual light emitting diodes LED is low, the efficiency in light emission of a group of adjacent light emitting diodes can be prevented from lowering due to such an arrangement that the density of the light emitting diodes LED at the top is high.

In addition, the above described gradient of the temperature in the backlight BL tends to gradually become higher from the bottom to the top of the backlight BL, and therefore, in the present embodiment, the intervals between light emitting diodes LED gradually becomes smaller, as shown in FIG. 1. As a result, the efficiency of light emission from the light source as a whole can be made uniform, without any inconsistency between the top and bottom. Accordingly, such effects can be gained that the brightness of the backlight BL is uniform in the surface light source.

Second Embodiment

Figure 4:
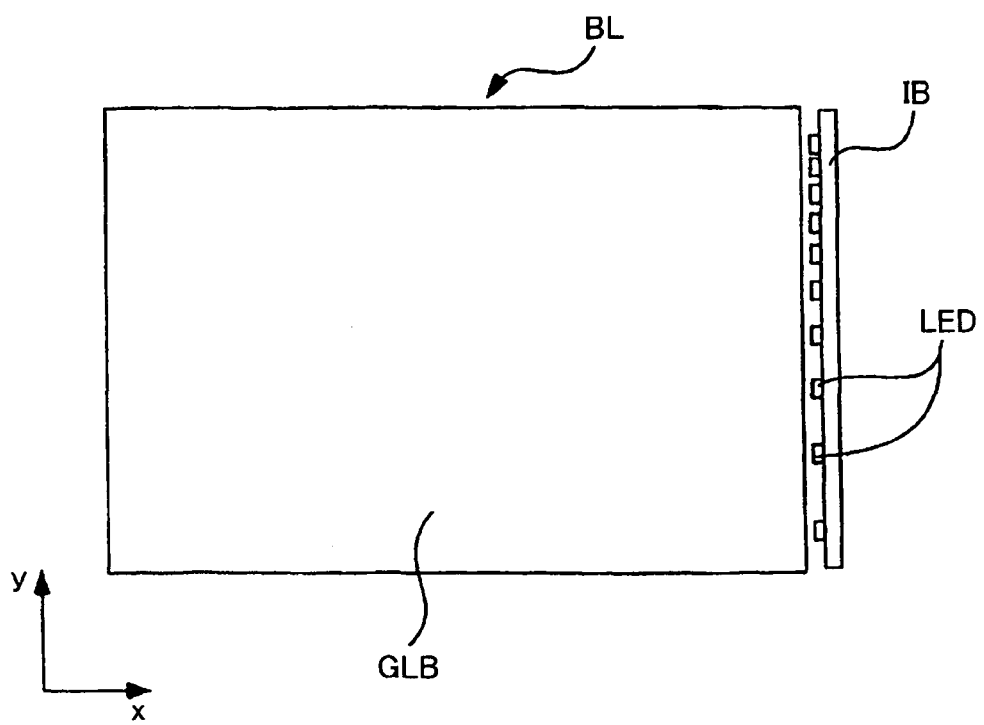
FIG. 4 is a plan diagram showing the backlight provided in the liquid crystal display device according to another embodiment of the present invention.

FIG. 4 is a diagram illustrating the liquid crystal display device according to another embodiment of the present invention, which corresponds to FIG. 1.

The structure is different from that in FIG. 1 in that light emitting diodes LED for the backlight BL are aligned on only one side of the light guide plate GLB in the direction y in the figure, and no diodes are aligned on the other side, but the same in that the intervals between the light emitting diodes LED becomes gradually smaller from the bottom up.

In this structure, the above described light emitting diodes LED are aligned in the up-down direction of the backlight BL, and thus, the same effects can be achieved as in the first embodiment.

Third Embodiment

Figure 5:
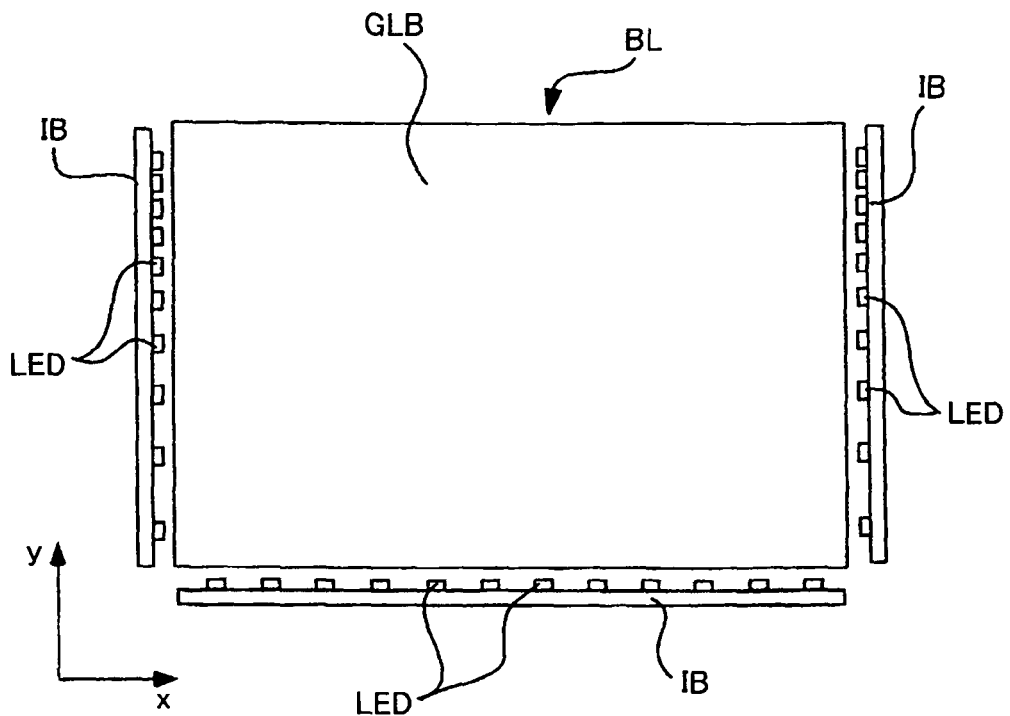
FIG. 5 is a plan diagram showing the backlight provided in the liquid crystal display device according to still another embodiment of the present invention.

FIG. 5 is a diagram illustrating the liquid crystal display device according to another embodiment of the present invention, which corresponds to FIG. 1.

The structure is different from that in FIG. 1 in that light emitting diodes LED for the backlight are aligned also along the lower side of the light guide plate GLB in the direction x in the figure. The group of light emitting diodes LED on the lower side is provided in order to increase the brightness o the backlight as a whole. The interval between light emitting diodes LED in the group of light emitting diodes LED on the lower side is the same. No light emitting diodes LED are provided on the upper side, because the efficiency of light emission is poor, due to the effects of high temperature. No light emitting diodes LED are provided on the upper side, so that an opening for discharging air can be provided on the upper side, and thus it becomes possible to release heat efficiently while the brightness increases.

Though not shown, additional light emitting diodes LED may be aligned along the upper side of the light guide plate GLB in the direction X in the figure. The interval between the light emitting diodes LED in the group of light emitting diodes LED on the upper side is also the same.

In the case where light emitting diodes LED are provided along both the upper and lower side, the interval between the light emitting diodes LED aligned along the upper side in the direction X in the figure is smaller than the interval between the light emitting diodes LED aligned along the lower side. This is because the difference in efficiency of light emission due to difference in temperature in the up-down direction is taken into account, and this structure allows the efficiency of light emission between the upper and lower groups of light emitting diodes LED to be uniform.

Fourth Embodiment

Figure 6A:
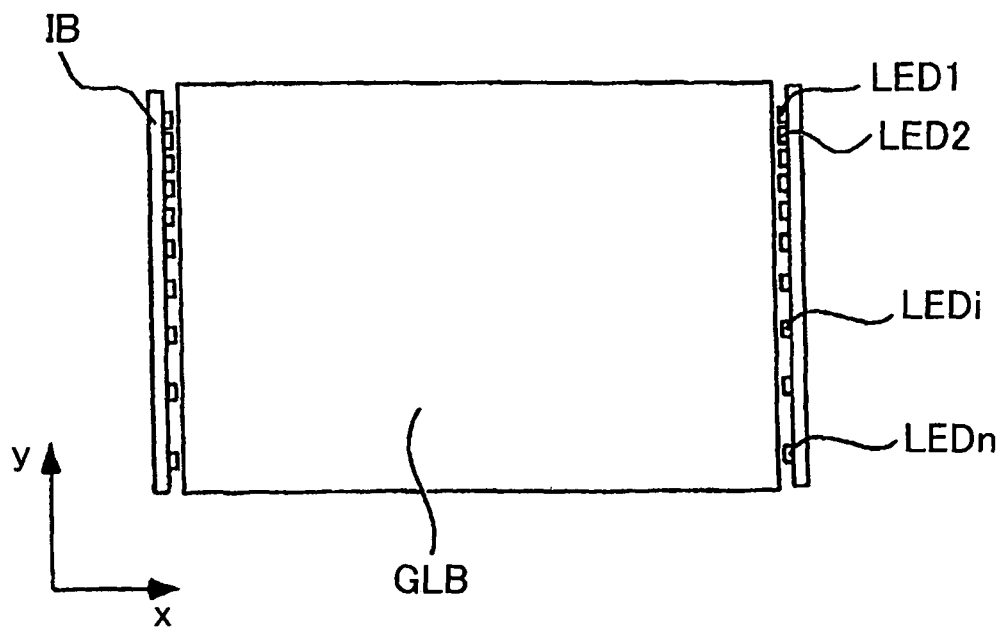
FIG. 6 is a plan diagram showing the backlight provided in the liquid crystal display device according to yet another embodiment of the present invention.
Figure 6B:
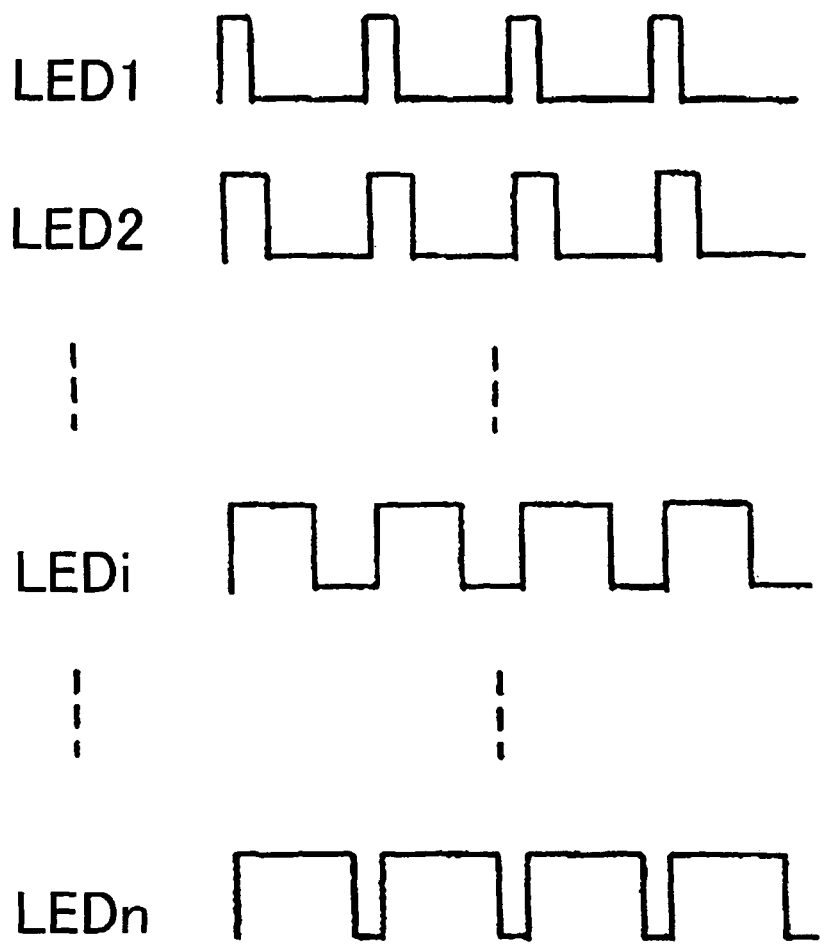

FIG. 6 is a diagram illustrating the liquid crystal display device according to another embodiment of the present invention. FIG. 6(a) shows the backlight BL in FIG. 1, and FIG. 6(b) shows the voltage applied to the respective light emitting diodes LED.

When the respective light emitting diodes LED aligned in the backlight BL shown in FIG. 6(a) from the top to the bottom are denoted as LED1, LED2 . . . LEDi . . . LEDn, the waveforms for the voltage applied to them can be shown as LED1, LED2 . . . LEDi . . . LEDn, as in FIG. 6(b).

The voltage applied to the respective light emitting diodes LED1, LED2 . . . LEDi . . . LEDn in FIG. 6 is a pulse voltage, the period of which is the same for all diodes.

In addition, the duty ratio of the pulse voltage applied to the light emitting diode LED1 is smaller than the duty ratio of the pulse voltage applied to the light emitting diode LED2, the duty ratio of the pulse voltage applied to the light emitting diode LED2 is smaller than the duty ratio of the pulse voltage applied to the light emitting diode LED3 . . . and thus, the relationship is such that the duty ratio of the pulse voltage applied to the light emitting diode LED(n−1) is smaller than the duty ratio of the pulse voltage applied to the light emitting diode LEDn.

As described above, the higher up in the backlight BL the light emitting diodes LED are placed, the shorter the life is, due to the difference in temperature, and taking this tendency into consideration, the duty ratio of the pulse voltage is smaller in the light emitting diodes LED placed at the top. As a result, it becomes possible to secure a long life for the light emitting diodes LED and make the life the same for all of the light emitting diodes LED.

Fifth Embodiment

Figure 7A:
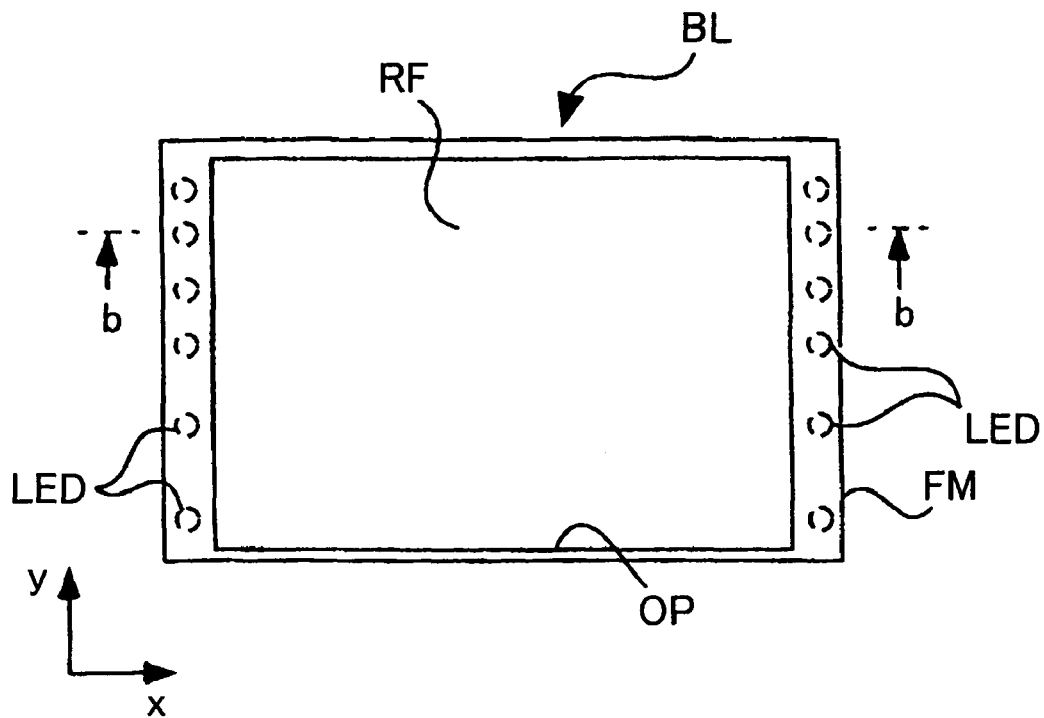
FIG. 7 is a plan diagram showing the backlight provided in the liquid crystal display device according to still yet another embodiment of the present invention.
Figure 7B:
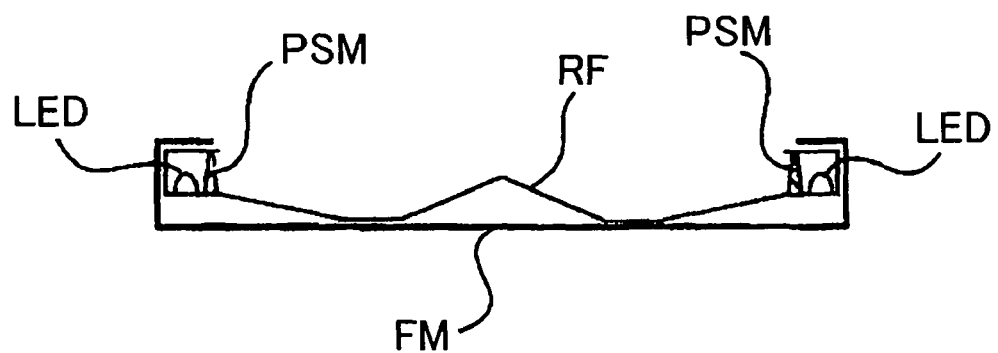

FIG. 7(a) is a plan diagram, and FIG. 7(b) is a cross sectional diagram along line b-b in FIG. 7(a).

The backlights BL of the first to fourth embodiments are formed so as to be provided with a light guide plate GLB. However, the invention is not limited to this, and as shown in FIG. 7, the structure may be provided with a reflective plate RF instead of a light guide plate GLB, for example.

The backlight BL has a housing FM with an opening OP in such a portion as to face the display region AR of the above described liquid crystal display panel PNL. A reflective plate RF is placed over the entirety of the bottom of the housing FM, and light emitting diodes LED are placed along the left and right side of the reflective plate RF in the figure.

Light from the respective light emitting diodes LED is directed toward the reflective plate RF via a prism PSM, and reflected from the reflective plate RF toward the above described liquid crystal display panel PNL.

In the case of this structure also, as shown in FIG. 7(a), the interval between a number of light emitting diodes LED aligned on the left and right side of the reflective plate RF in the direction y in the figure becomes gradually greater from the top down in the arrangement in the figure, as in the first embodiment.

Sixth Embodiment

In the first to fifth embodiments, the interval between adjacent light emitting diodes LED which are aligned gradually becomes greater from the top down in the backlight BL in the arrangement.

Alternatively, the backlight BL may be horizontally divided into a number of regions where the interval between light emitting diodes LED aligned within each region is the same, and the intervals of the light emitting diodes LED may gradually become greater between the respective regions from the top down. Thus, the same effects as in the first embodiment can be gained.

Though the present invention is described using the above embodiments, the structures described in these embodiments are mere examples, and appropriate modifications of the present invention re possible within such a scope as not to deviate from the technical idea. In addition, the structures described in the respective embodiments may be combined for use, as long as they do not conflict.

The invention claimed is:

1. A liquid crystal display device which stands on a horizontal surface for use, comprising:
    a liquid crystal display panel; and
    a backlight provided on the rear of this liquid crystal display panel, characterized in that
    the light emitting source of said backlight is formed of a number of light emitting diodes, at least some of which are aligned in the up-down direction of the backlight, and
    the interval between light emitting diodes aligned at the top of said backlight is smaller than the interval between light emitting diodes aligned at the bottom of said backlight.

2. The liquid crystal display device according to claim 1, characterized in that said light emitting diodes are aligned so that the interval between said light emitting diodes becomes smaller from the top down in steps.

3. The liquid crystal display device according to claim 1, characterized in that said backlight is formed of a light guide plate placed so as to face at least the display region of said liquid crystal display panel, and a number of light emitting diodes aligned along at least one side wall from among the left and right side walls of the light guide plate, so that light from said light emitting diodes is guided toward said liquid crystal display panel through said light guide plate.

4. The liquid crystal display device according to claim 1, characterized in that said backlight has a reflective plate placed so as to face at least the display region of said liquid crystal display panel and a number of light emitting diodes placed along at least one side from among the left and right sides of the reflective plate, so that light from said light emitting diodes is guided toward said liquid crystal display panel via said reflective plate.

5. The liquid crystal display device according to claim 1, characterized in that a pulse voltage is applied to the light emitting diodes, and the duty ratio of the pulse voltage applied to light emitting diodes provided at the top of said backlight is smaller than the duty ratio of the pulse voltage applied to light emitting diodes provided at the bottom of said backlight.

6. The liquid crystal display device according to claim 1, characterized in that a number of light emitting diodes are aligned along the bottom side of said backlight.

7. The liquid crystal display device according to claim 6, characterized in that a number of light emitting diodes are aligned along the top side of said backlight.

8. The liquid crystal display device according to claim 7, characterized in that the interval between light emitting diodes is the same at the top and bottom of said backlight.

9. The liquid crystal display device according to claim 7, characterized in that the interval between light emitting diodes provided along the top side of said backlight is smaller than the interval between light emitting diodes provided along the bottom side of said backlight.

* * * * *